(12) United States Patent
Takeuchi et al.

(10) Patent No.: US 7,662,352 B2
(45) Date of Patent: Feb. 16, 2010

(54) METHOD AND SYSTEM FOR REMOVING MERCURY FROM FLUE GAS

(75) Inventors: Yasuhiro Takeuchi, Hiroshima (JP); Yoshio Nakayama, Hiroshima (JP); Satoru Sugita, Hiroshima (JP); Susumu Okino, Hiroshima (JP); Shintaro Honjo, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 56 days.

(21) Appl. No.: 11/574,134

(22) PCT Filed: Feb. 23, 2006

(86) PCT No.: PCT/JP2006/003316

§ 371 (c)(1),
(2), (4) Date: Jun. 3, 2008

(87) PCT Pub. No.: WO2006/093026

PCT Pub. Date: Sep. 8, 2006

(65) Prior Publication Data

US 2009/0004085 A1    Jan. 1, 2009

(30) Foreign Application Priority Data

Feb. 28, 2005  (JP) .......................... 2005-054199
May 12, 2005  (JP) .......................... 2005-139696

(51) Int. Cl.
*B01D 53/64*  (2006.01)
*B01D 53/74*  (2006.01)
*G05B 1/00*   (2006.01)

(52) U.S. Cl. ................. 423/210; 423/DIG. 5; 422/105; 422/108; 422/111; 422/168; 422/169; 422/170; 422/171; 422/172; 422/177; 422/180

(58) Field of Classification Search ................. 423/210, 423/DIG. 5; 422/105, 108, 111, 168–172, 422/177, 180
See application file for complete search history.

(56) References Cited

U.S. PATENT DOCUMENTS 4,818,505 A * 4/1989 Muller ....................... 423/210

FOREIGN PATENT DOCUMENTS

| JP | 61-222525 A | 10/1986 |
|---|---|---|
| JP | 10-230137 A | 9/1998 |
| JP | 2000-325747 A | 11/2000 |
| JP | 2002-177741 A | 6/2002 |
| JP | 2002-349821 A | 12/2002 |
| JP | 2004-66229 A | 3/2004 |
| JP | 2004-313833 A | 11/2004 |

* cited by examiner

*Primary Examiner*—Timothy C Vanoy
(74) *Attorney, Agent, or Firm*—Lowe Hauptman Ham & Berner

(57) ABSTRACT

A biomass feeding unit feeds biomass to a boiler. A hydrogen-chlorine monitoring unit measures hydrogen-chloride content in flue gas fed to a desulfurization equipment. A mercury monitoring unit measures mercury content in treated flue gas emitted from the desulfurization equipment. A feed-amount instruction unit instructs proper feed amount of the biomass to the biomass feeding unit based on measurement values obtained by the hydrogen-chlorine monitoring unit and the mercury monitoring unit.

8 Claims, 5 Drawing Sheets

METHOD AND SYSTEM FOR REMOVING MERCURY FROM FLUE GAS

RELATED APPLICATIONS

The present application is a National Phase entry of International Application Number PCT/JP2006/303316, filed Feb. 23, 2006, which claims priority from, Japanese Application Numbers 2005-054199, filed Feb. 28, 2005 and 2005-139696, filed May 12, 2005, the disclosures of which are hereby incorporated by reference herein in their entirety.

TECHNICAL FIELD

The present invention relates to a method and system for removing mercury from flue gas emitted from a boiler.

BACKGROUND ART

Systems for removing mercury from flue gas have been studied in various ways because the flue gas emitted from a boiler, which is a combustion equipment in a thermal power plant, contains high-toxicity mercury.

In general, the boiler includes a wet desulfurization equipment to remove sulfur from the flue gas. It is well known that, in a flue-gas treatment system that includes the desulfurization equipment as a flue-gas treatment equipment and the boiler, when the amount of chlorine (Cl) in the flue gas increases, a proportion of the amount of water-soluble divalent mercury to the amount of chlorine increases, making it easier to trap mercury in the desulfurization equipment. Based on the above knowledge, conventionally, a system for removing mercury, in which chlorine compounds such as $CaCl_2$ is added to fuel to be fed into the boiler to improve mercury removal efficiency in the desulfurization equipment, has been proposed (Patent Document 1).

Patent document 1: Japanese Patent Application Laid-Open No. 2000-325747

DISCLOSURE OF INVENTION

Problem to be Solved by the Invention

According to the conventional system for removing mercury from flue gas, however, there is a growing concern about a degradation of the combustion efficiency and there is a problem that excess combustion residue is accumulated in a bottom portion of a reactor, caused by adding such substance as $CaCl_2$, which is not related to the combustion, into the reactor.

The present invention has been made in view of the above issue and an object thereof is to provide a method and system for removing mercury from flue gas without degrading a combustion efficiency, without increasing a combustion residue, and realizing a reduction of costs for a removing operation.

Means for Solving Problem

To solve the above problems, inventors of the present invention has energetically made experiments and examinations, thereby having found following knowledge.

Namely, it is ensured that coal and heavy oil, which are mainly used as fuel for a boiler, have generally low-chlorine content, while biomass that can be used as the fuel contains relatively high chlorine. The biomass is an organic energy from living things, including wood material, agricultural waste, raw garbage, sewage, etc. Thus, it is assured that, if the biomass is substituted for a portion of the fuel, at least a portion of necessary amount of chlorine for removing mercury in the desulfurization equipment can be automatically fed. Accordingly, it is ensured that the removal of the mercury in the desulfurization equipment can be surely improved. It is confirmed that using biomass of carbide of sewage sludge having high-chlorine content of about 0.2 wt % and dual-fueling a portion of the biomass equivalent to 5 cal % of main fuel such as coal and heavy oil are enough to sufficiently remove the mercury in the desulfurization equipment.

A mercury removing system according to one aspect of the present invention is for removing mercury from flue gas treated in a flue-gas treatment system including a boiler and a desulfurization equipment that removes sulfur component from flue gas emitted from the boiler. The mercury removing system includes a biomass feeding unit that feeds biomass to the boiler; a hydrogen-chlorine monitoring unit that measures hydrogen-chloride content in the flue gas fed to the desulfurization equipment; a mercury monitoring unit that measures mercury content in treated flue gas emitted from the desulfurization equipment; and a feed-amount instruction unit that instructs proper feed amount of the biomass to the biomass feeding unit based on measurement values obtained by the hydrogen-chlorine monitoring unit and the mercury monitoring unit.

The mercury removing system according to the present invention further includes a hydrogen-chloride injection unit that injects hydrogen chloride to the flue gas emitted from the boiler.

The mercury removing system according to the present invention further includes at least one mercury-oxidation catalyst tank installed on a flue-gas path between an outlet of the boiler and a position where the hydrogen-chlorine monitoring unit is installed.

The mercury removing system according to the present invention further includes an oxidation-reduction-potential control unit that measures an oxidation-reduction-potential of absorbing solution collected at a bottom portion of the desulfurization equipment, and controls feed amount of an oxidation agent to be fed to the bottom portion of the desulfurization equipment based on the measured oxidation-reduction-potential.

A method according to another aspect of the present invention is for removing mercury from flue gas treated in a flue-gas treatment system that includes a boiler and a desulfurization equipment for removing sulfur from flue gas emitted from the boiler. The method includes feeding biomass to the boiler; measuring hydrogen-chloride content in the flue gas fed to the desulfurization equipment; measuring mercury content in treated flue gas emitted from the desulfurization equipment; and controlling proper feed amount of the biomass, in proportion to chlorine amount enabling to remove mercury in the desulfurization equipment, based on measurement values obtained by measuring the hydrogen-chlorine content and measuring the mercury content.

The method according the present invention further includes injecting hydrogen chloride to the flue gas emitted from the boiler. The injecting includes injecting, when chlorine amount fed by the biomass is deficient, hydrogen chloride by an amount of deficiency to the flue gas.

The method according to the present invention further includes promoting oxidation of mercury in the flue gas fed to the desulfurization equipment by installing at least one mercury-oxidation catalyst tank on a flue-gas path between an outlet of the boiler and a position where the hydrogen-chlorine monitoring unit is installed.

The method according to the present invention further includes preventing re-emission of mercury trapped in the absorbing solution collected in the bottom portion of the desulfurization equipment by installing an oxidation-reduction-potential control unit that measures an oxidation-reduction-potential of absorbing solution collected at a bottom portion of the desulfurization equipment, and controlling feed amount of an oxidation agent to be fed to the bottom portion of the desulfurization equipment based on the measured oxidation-reduction-potential.

EFFECT OF THE INVENTION

According to the present invention, the method and system for removing mercury from flue gas can effectively remove mercury from flue gas without degrading a combustion efficiency of a boiler and without increasing combustion residue. Further, costs for a removal operation can be reduced.

EXPLANATIONS OF LETTERS OR NUMERALS

Figure 1:
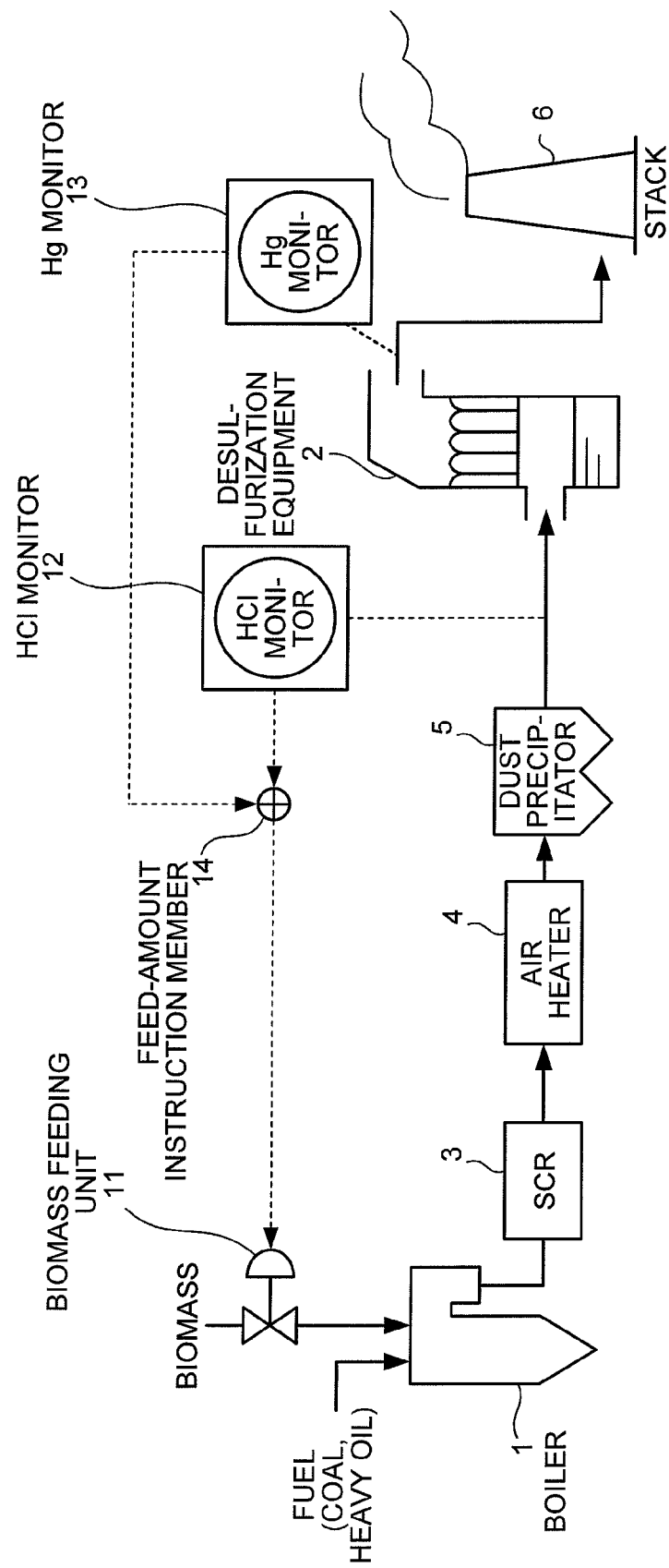
FIG. 1 is a schematic of a general structure of a system for removing mercury from flue gas according to a first embodiment of the present invention.

1 Boiler
2 Desulfurization equipment
3 Selective catalytic reducer
4 Air heater
5 Dust precipitator
6 Stack
11 Biomass feeding unit
12 Hydrogen chloride monitor
13 Mercury monitor
14 Determining device (feed-amount instruction member)
20 Hydrogen-chloride injection member
31, 32 Mercury-oxidation catalyst tank
41 Oxidation-reduction-potential measurement-control member

BEST MODE(S) FOR CARRYING OUT THE INVENTION

Exemplary embodiments of a system and a method of moving mercury from flue gas according to the present invention are explained below in detail with reference to the accompanying drawings. The present invention is not limited to the embodiments explained below.

First Embodiment

FIG. 1 is a schematic of a general structure of a system for removing mercury from flue gas according to a first embodiment of the present invention.

The system for removing mercury according to the present invention realizes a function of removing mercury when the system is installed in an existing flue-gas treatment facility including a wet desulfurization equipment. The existing flue-gas treatment facility having a minimal structure includes a boiler 1 and a desulfurization equipment 2 for removing sulfur component from flue gas emitted from the boiler 1. Generally, in addition to the above structure, a selective catalytic reducer (SCR) 3, an air heater 4, and a dust precipitator 5 are sequentially installed, from an upstream side, between the boiler 1 and the desulfurization equipment 2. The flue gas from the desulfurization equipment 2 is emitted from a stack 6.

The system for removing mercury from flue gas according to the first embodiment includes a biomass feeding unit 11 that feeds biomass to the boiler 1, a hydrogen chloride monitor 12 that monitors a hydrogen chloride content in the flue gas fed to the desulfurization equipment 2, namely, the flue gas emitted from the dust precipitator 5, a mercury monitor 13 that monitors a mercury content in treated flue gas emitted from the desulfurization equipment 2, and a determining device (feed-amount instruction member) 14 that instructs a proper feed-amount of the biomass to the biomass feeding unit 11 based on each measurement of the hydrogen chloride monitor 12 and the mercury monitor 13.

The system for removing mercury from flue gas, according to the first embodiment, includes the biomass feeding unit 11 that feeds the biomass containing chlorine to the boiler 1, the hydrogen chloride monitor 12 that monitors the hydrogen chloride content in the flue gas fed to the desulfurization equipment 2, the mercury monitor 13 that monitors the mercury content in the treated flue gas emitted from the desulfurization equipment 2. The determining device 14 determines a feed amount of the biomass, in proportion to an amount of chlorine enabling to remove the mercury by the chlorine in the desulfurization equipment 2, based on each measurement value of the hydrogen chloride monitor 12 and the mercury monitor 13. According the determination, the determining device 14 sends a control signal to the biomass feeding unit 11 to control the amount of the biomass to be fed.

According to the first embodiment, hydrogen chloride concentration and mercury concentration in the flue gas can be monitored and the amount of the biomass to be fed can be controlled. If the hydrogen chloride concentration in the flue gas decreases and/or the mercury concentration in the flue gas at an inlet of the stack 6 increases, a relative amount of the biomass in mixture of fuel is to be increased so that the hydrogen chloride concentration of the flue gas increases to induce an oxidization of the mercury in the flue gas. As a result, mercury removal efficiency in the desulfurization equipment 2 can be improved.

The determining device 14 primarily determines whether the mercury monitor 13 detects even a small amount of mercury in the flue gas and sends the control signal to the biomass feeding unit 11 for increasing the feed amount of the biomass. When the mercury monitor 13 does not detect mercury in the flue gas, if the chlorine concentration in the flue gas is less than that necessary for removing the mercury in the desulfurization equipment 2, the determining device 14 sends the control signal to the biomass feeding unit 11 for increasing the feed amount of the biomass.

The necessary amount of chlorine for removing the mercury in the desulfurization equipment 2 is explained below.

Figure 2:
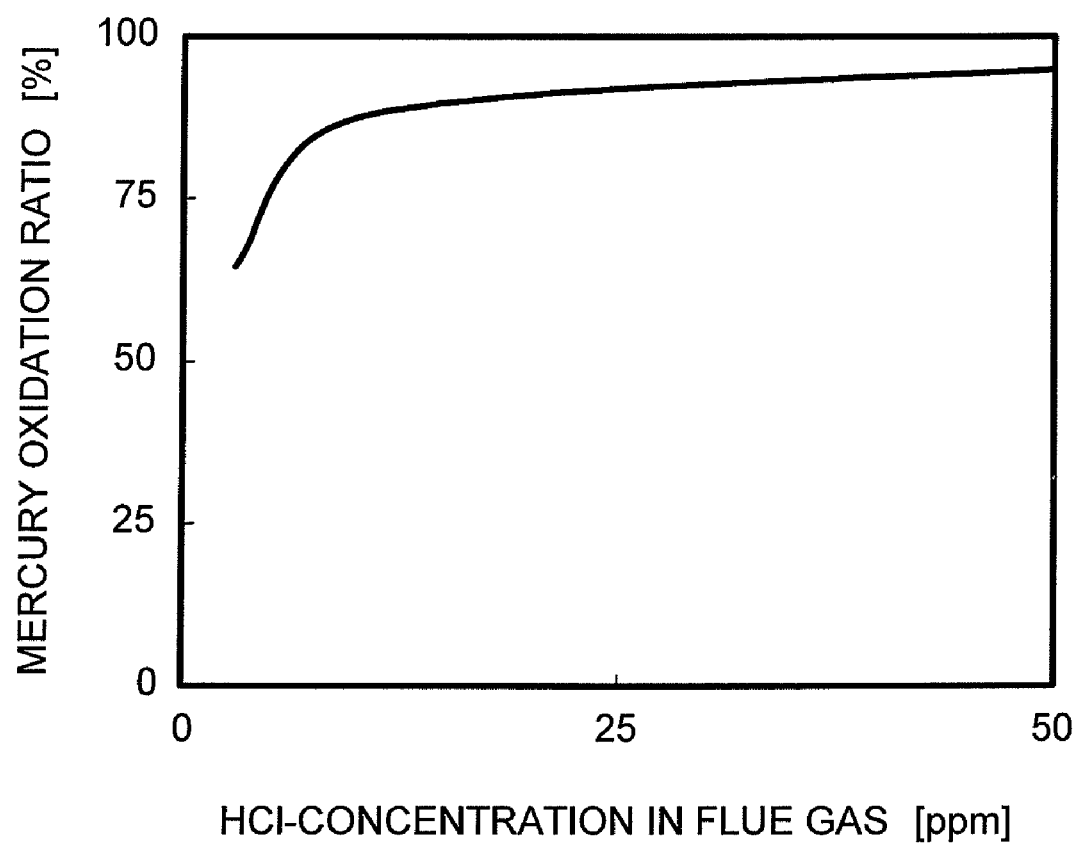
FIG. 2 is a graph of a relationship between mercury oxidation ratio and hydrogen chloride concentration in flue gas.

To remove the mercury in the desulfurization equipment, the mercury needs to be water-soluble divalent mercury. It is widely known that, when the hydrogen chloride concentration in the flue gas increases, a ratio of the divalent mercury in the flue gas increase, resulting in making the removal of the mercury in the desulfurization equipment 2 easier. FIG. 2 is a graph of a relationship between the hydrogen chloride concentration in the flue gas and mercury oxidation ratio with a predetermined amount of desulfurization catalyst in a downstream side of the desulfurization equipment 2, which is expressed by (mercury oxidation ratio(%))=(divalent mercury concentration)×100/{(divalent mercury concentration)+mercury concentration}

To feed the necessary amount of the chlorine for removing the mercury in the desulfurization equipment 2 only by mixing the biomass in the fuel, for example, by referring to the relationship between the hydrogen chloride concentration and the mercury oxidation ratio shown in FIG. 2, if a target mercury oxidation ratio is determined as 90%, the biomass having chlorine content of more than 0.1 wt % on dry-ash free basis is needed (the relative amount of the biomass in the mixture of the fuel is 5 cal % assuming a heating value of carbide of sewage sludge).

Second Embodiment

Figure 3:
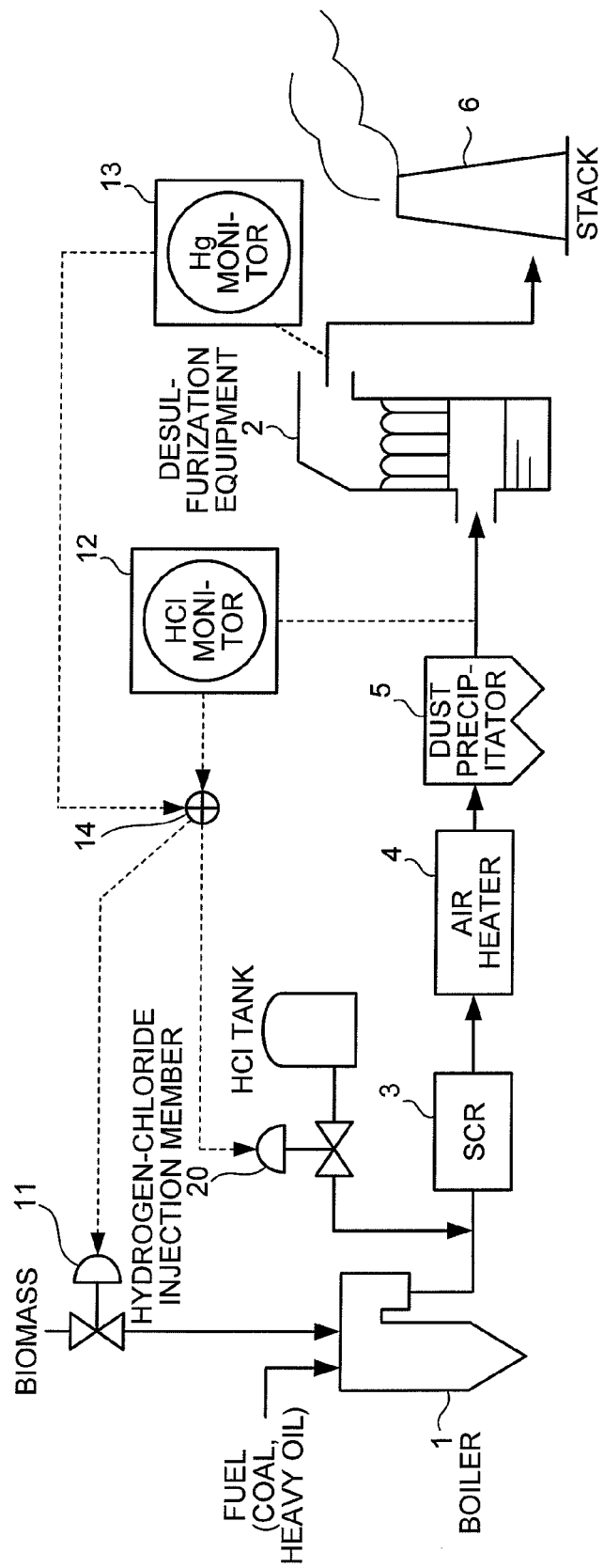
FIG. 3 is a schematic of a general structure of a system for removing mercury from flue gas according to a second embodiment of the present invention.

The structure explained in the first embodiment is a basic structure of the system for removing mercury from flue gas according to the present invention. According to a second embodiment of the present invention shown in FIG. 3, a hydrogen-chloride injection member 20 is installed between the boiler 1 and the SCR 3 for injecting hydrogen chloride into flue gas.

The system for removing mercury from flue gas according to the second embodiment includes the hydrogen-chloride injection member 20 for injecting the hydrogen chloride into the flue gas emitted from the boiler 1. If an amount of the chlorine fed from the biomass is deficient, the hydrogen chloride is injected into the flue gas by the hydrogen-chloride injection member 20 for making up the deficiency of the chlorine.

According to the second embodiment, the hydrogen chloride concentration and the mercury concentration in the flue gas can be monitored, the determining device 14 determines whether an amount of the chlorine to be added by the biomass is deficient, and the hydrogen chloride gas is injected into the flue gas for making up the deficiency of the chlorine. In other words, when mercury is not sufficiently oxidized by the biomass and/or chloride induced from other fuel, the hydrogen-chloride injection member 20 is installed to make up the deficiency of the chlorine. By increasing the hydrogen chloride concentration in the flue gas, mercury oxidation can be further induced and the mercury removal efficiency in the desulfurization equipment 2 can be improved.

Third Embodiment

Figure 4:
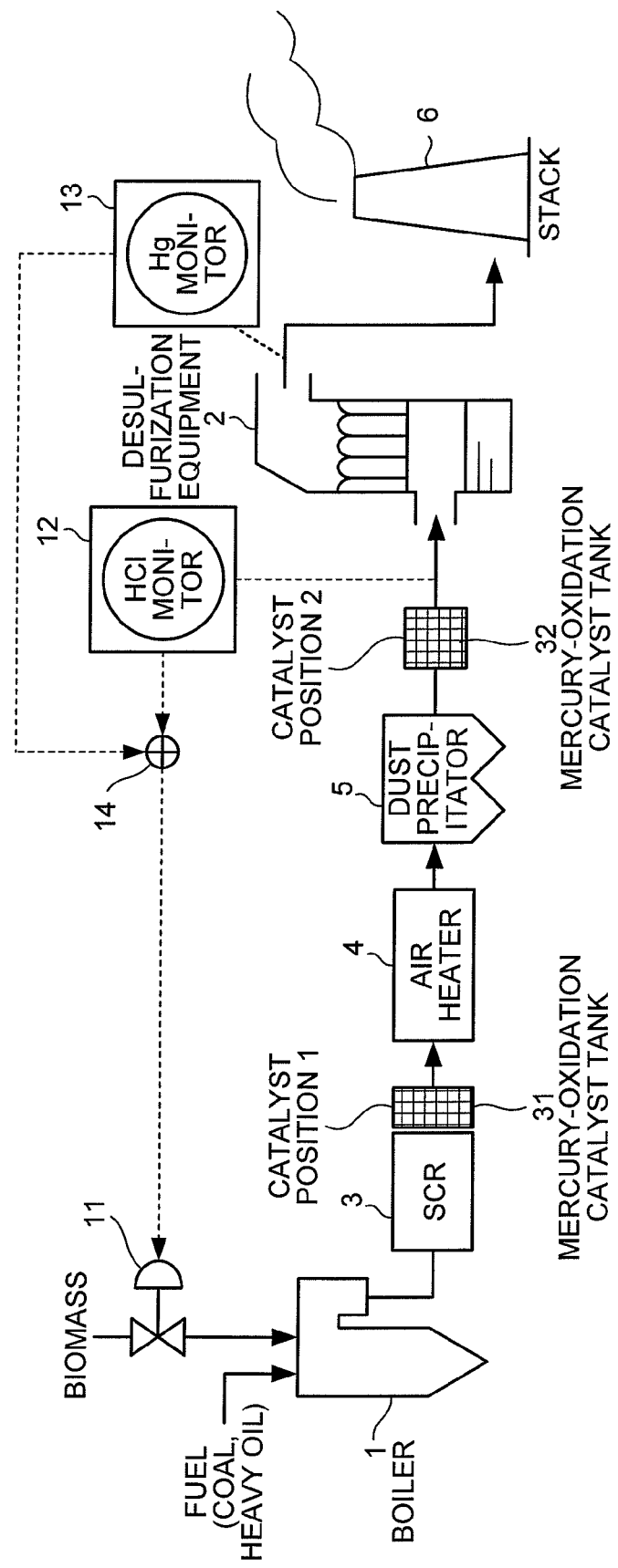
FIG. 4 is a schematic of a general structure of a system for removing mercury from flue gas according to a third embodiment of the present invention.

FIG. 4 is a schematic for explaining a third embodiment according to the present invention. According to the third embodiment, in addition to the configuration of the first embodiment, a mercury-oxidation catalyst tank is installed in at least one of a downstream side of the SCR 3 equipped in a downstream side of an outlet of the boiler 1 and a downstream side of the dust precipitator 5. A mercury-oxidation catalyst tank 31 can be installed in the downstream side of the SCR 3, and alternately, the mercury-oxidation catalyst tank 31 can be installed in the downstream side of the dust precipitator 5, each of which makes no significant differences in terms of effectiveness. In terms of effectiveness, it is preferable to install the two mercury-oxidation catalyst tanks. However, one mercury-oxidation catalyst tank is effective enough.

The system for removing mercury from flue gas according to the third embodiment includes at least one of the mercury-oxidation catalyst tank 31 (32) on a path of the flue gas, between the outlet of the boiler 1 and a position where the hydrogen-chloride monitor 12 is installed, to induce the oxidation of the mercury in the flue gas fed to the desulfurization equipment 2.

According to the system for removing mercury from flue gas of the third embodiment, the mercury-oxidation catalyst tank 31 and/or a mercury-oxidation catalyst tank 32 are installed to further induce the oxidation of the mercury in the flue gas. As for a catalyst, at least one of $TiO_2$, $SiO_2$, $ZrO_2$, $Al_2O_3$, and zeolite is used for a carrier and the carrier supporting at least one of Pt, Ru, Rh, Pd, Ir, V, W, Mo, Ni, Co, Fe, Cr, Cu, and Mn is used for the catalyst.

Fourth Embodiment

Figure 5:
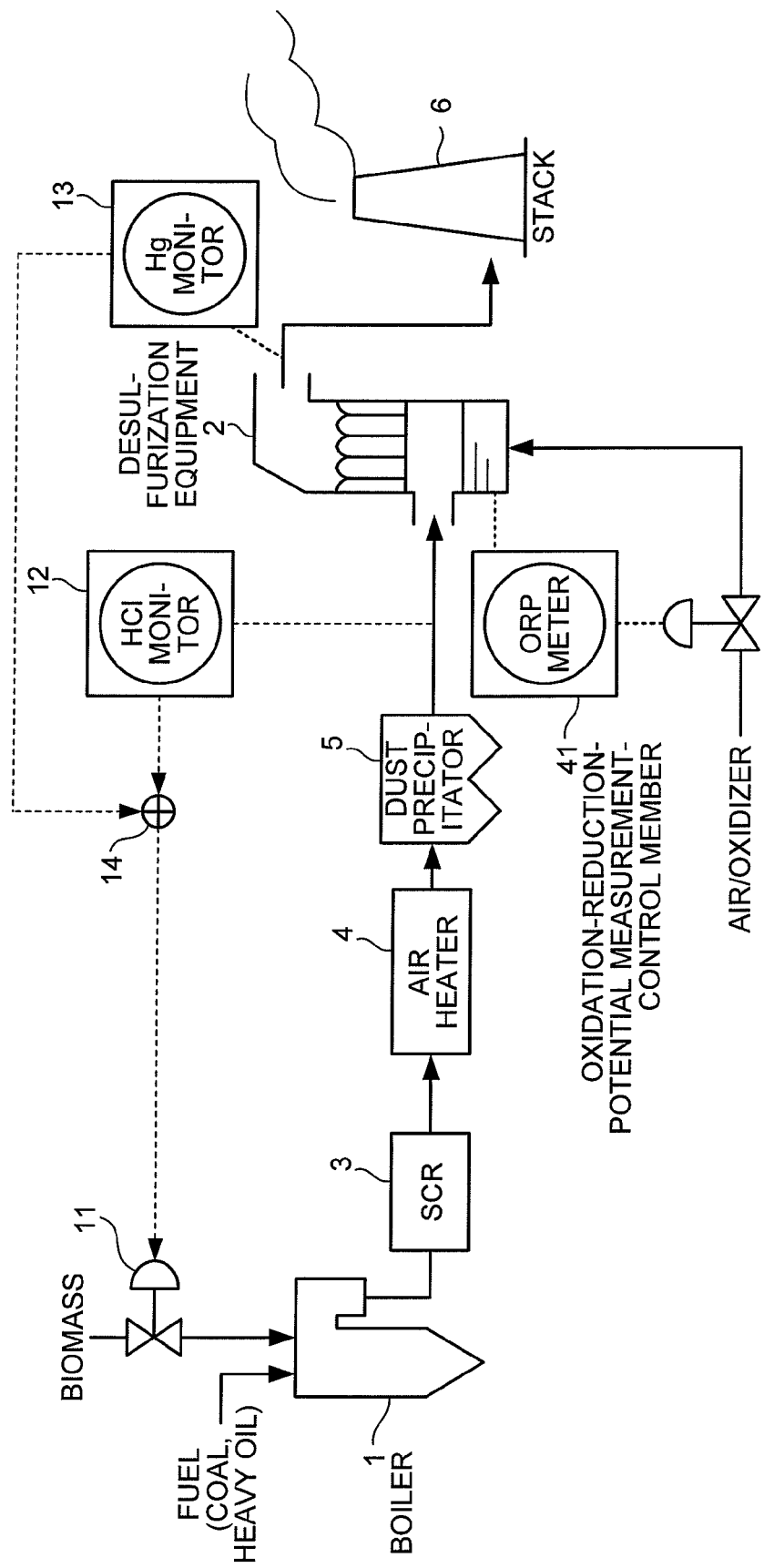
FIG. 5 is a schematic of a general structure of a system for removing mercury from flue gas according to a fourth embodiment of the present invention.

FIG. 5 is a schematic for explaining a fourth embodiment according to the present invention. According to the fourth embodiment, in addition to the configuration of the first embodiment, an oxidation-reduction-potential measurement-control member 41 is further installed to measure an oxidation-reduction-potential value of absorbing solution collected in a bottom portion of the desulfurization equipment 2 and to control a feed amount of an oxidation agent to be fed to the bottom portion of the desulfurization equipment 2 based on the measured oxidation-reduction-potential value.

According to the system for removing mercury from flue gas of the fourth embodiment, the oxidation-reduction-potential measurement-control member 41 is further installed to measure the oxidation-reduction-potential value of the absorbing solution collected in the bottom portion of the desulfurization equipment 2 and to control the feed amount of the oxidation agent to be fed to the bottom portion of the desulfurization equipment 2 based on the measured oxidation-reduction-potential value. Owing to the oxidation-reduction-potential measurement-control member 41, re-emission of the mercury trapped in the absorbing solution collected in the bottom portion of the desulfurization equipment 2 can be prevented.

According to the fourth embodiment, the oxidation-reduction-potential measurement-control member 41 is further installed to the desulfurization equipment 2 to control the feed amount of oxidation air or the oxidation agent. The feed amount of the oxidation air or the oxidation agent can be controlled and the absorbing solution can be oxidative atmosphere. As a result, the re-emission of the mercury from the absorbing solution can be prevented.

The oxidation-reduction-potential value of the absorbing solution in the desulfurization equipment 2 needs to range between 150 mV and 600 mV to prevent the re-emission of the mercury from the absorbing solution. When the oxidation-reduction-potential value is in the above range, the mercury trapped as $HgCl_2$ in the absorbing solution becomes stable, so that the re-emission of the mercury to air can be prevented. A technology for preventing the re-emission of the mercury by using the oxidation-reduction-potential value is disclosed in Japanese Patent Application Laid-Open No. 2004-313833. However, as a result of a further examination, it is ensured that the above range is more preferable.

Examination Example

The mercury removal efficiency was measured in the system according to the third embodiment shown in FIG. 4, under a condition that only the mercury-oxidation catalyst tank 32 was installed in the downstream side of the dust precipitator 5. For evaluations, gas sampling was conducted in three positions: between the dust precipitator 5 and the mercury-oxidation catalyst tank 32 (S1), between the mercury-oxidation catalyst tank 32 and the desulfurization equipment 2 (S2), and right after an outlet of the desulfurization equipment 2 (S3).

Carbide of sewage sludge was used as a biomass to be dual-fueled. The chlorine concentration of the carbide of the sewage sludge was 0.2 wt % on dry-ash free basis. A relative amount of the biomass to be dual-fueled was fixed at 5 cal %.

As a mercury oxidation catalyst, a catalyst mainly containing $V_2O_5/TiO_2$—$SiO_2$ was used. Catalyst temperature was set at 350° C. and catalyst SV was set to 6000 $h^{-1}$.

Actual measurement was conducted under conditions, of which the biomass was dual-fueled, and of which the biomass was not dual-fueled, as for gas composition of the flue gas obtained at the outlet of the boiler 1. A result obtained from the measurement is shown below in a table 1.

[Table 1]

TABLE 1

Gas composition (Example: at outlet of boiler 1)

| Item | | Coal Single-fuel | Coal/Biomass Dual-fuel |
|---|---|---|---|
| Pressure | | Normal | Normal |
| $H_2O$ | % (wet) | 8 | 8 |
| $CO_2$ | % (dry) | 15 | 15 |
| $O_2$ | % (dry) | 4 | 4 |
| $N_2$ | % (dry) | Balance | Balance |
| HCl | ppm (dry) | 5 | 22 |
| $SO_2$ | ppm (dry) | 210 | 257 |
| Dust | g/m3N (dry) | 13 | 20 |
| Hg | μg/$m^3$N (dry) | 30 | 30 |

According to the present invention, the sampling gases obtained at each sampling position of S1, S2, and S3 was analyzed under the conditions, of which the biomass was dual-fueled, and of which the biomass was not dual-fueled. A result of the analysis is shown below in a table 2.

[Table 2]

TABLE 2

Gas sampling result

| | Sampling point | | | | | |
|---|---|---|---|---|---|---|
| | S1 | | S2 | | S3 | |
| | Position | | | | | |
| | Upstream of catalyst | | Downstream of catalyst | | Downstream of de-sulfurization equipment | |
| Item | Single-fuel | Dual-fuel | Single-fuel | Dual-fuel | Single-fuel | Dual-fuel |
| HCl concentration | 5 | 17 | 5 | 17 | <1 | <1 |
| Total Hg concentration | 30 | 30 | 30 | 30 | 9.3 | 4.8 |
| $HgCl_2$ concentration | 2.7 | 3.5 | 21.8 | 26.6 | 0.7 | 0.9 |
| Hg oxidation ratio | — | — | 73 | 89 | — | — |
| Hg removal ratio | — | — | — | — | 69 | 84 |

*1 Hg oxidation ratio = ($HgCl_2$ concentration (μg/$m^3$N) at sampling position S2/total Hg concentration (μg/$m^3$N) at sampling position S2) × 100
*2 Hg removal ratio = [((total Hg concentration at sampling position S2) – (total Hg concentration at sampling position S3))/total Hg concentration at sampling position S2] × 100

As assured in the table 1, mercury content in the flue gas from the boiler 1 was the same as 30 μg/$m^3$N under the both conditions, of which the biomass was dual-fueled, and of which the biomass was not dual-fueled. As is clear from the table 2, mercury content in the flue gas from the desulfurization equipment 2 was 9.3 μg/$m^3$N when the biomass was not dual-fueled. Alternately, mercury content in the flue gas from the desulfurization equipment 2 was decreased to 4.8 μg/$m^3$N when the biomass was dual-fueled according to the present invention. The residual amount of 4.8 μg/$m^3$N can be further decreased by installing the hydrogen-chloride injection member 20 shown in FIG. 3 according to the second embodiment.

INDUSTRIAL APPLICABILITY

As described above, according to the method and system for removing mercury from flue gas of the present invention, mercury can be effectively removed from flue gas without degrading a combustion efficiency of a boiler and without increasing combustion residue. Further, costs for a removal operation can be reduced.

The invention claimed is:

1. A mercury removing system for removing mercury from flue gas treated in a flue-gas treatment system including a boiler and a desulfurization equipment that removes sulfur component from the flue gas emitted from the boiler, the mercury removing system comprising:
   a biomass feeding unit that feeds biomass to the boiler;
   a hydrogen-chlorine monitoring unit that measures hydrogen-chloride content in the flue gas fed to the desulfurization equipment;
   a mercury monitoring unit that measures mercury content in treated flue gas emitted from the desulfurization equipment; and
   a feed-amount instruction unit that instructs proper feed amount of the biomass to the biomass feeding unit based on measurement values obtained by the hydrogen-chlorine monitoring unit and the mercury monitoring unit.

2. The mercury removing system according to claim 1, further comprising:
   a hydrogen-chloride injection unit that injects hydrogen chloride to the flue gas emitted from the boiler.

3. The mercury removing system according to claim 1, further comprising:
   at least one mercury-oxidation catalyst tank installed on a flue-gas path between an outlet of the boiler and a position where the hydrogen-chlorine monitoring unit is installed.

4. The mercury removing system according to claim 1, further comprising:
   an oxidation-reduction-potential control unit that measures an oxidation-reduction-potential of absorbing solution collected at a bottom portion of the desulfurization equipment, and controls feed amount of an oxidation agent to be fed to the bottom portion of the desulfurization equipment based on the measured oxidation-reduction-potential.

5. A method of removing mercury from flue gas treated in a flue-gas treatment system that includes a boiler and a desulfurization equipment for removing sulfur from flue gas emitted from the boiler, the method comprising:
   feeding biomass to the boiler;
   measuring hydrogen-chloride content in the flue gas fed to the desulfurization equipment;
   measuring mercury content in treated flue gas emitted from the desulfurization equipment; and controlling proper feed amount of the biomass based on measurement values obtained measuring the hydrogen-chlorine content and the mercury content.

6. The method according to claim 5, further comprising:

injecting hydrogen chloride to the flue gas emitted from the boiler, wherein the injecting includes injecting, when chlorine amount fed by the biomass is deficient, hydrogen chloride by an amount of deficiency to the flue gas.

7. The method according to claim 5, further comprising:

promoting oxidation of mercury in the flue gas fed to the desulfurization equipment by installing at least one mercury-oxidation catalyst tank on a flue-gas path between an outlet of the boiler and a position where the hydrogen-chlorine monitoring unit is installed.

8. The method according to claim 5, further comprising:

preventing re-emission of mercury trapped in the absorbing solution collected in the bottom portion of the desulfurization equipment by installing an oxidation-reduction-potential control unit that measures an oxidation-reduction-potential of absorbing solution collected at a bottom portion of the desulfurization equipment, and controlling feed amount of an oxidation agent to be fed to the bottom portion of the desulfurization equipment based on the measured oxidation-reduction-potential.

* * * * *